United States Patent [19]

Gautier

[11] Patent Number: 4,763,561
[45] Date of Patent: Aug. 16, 1988

[54] BRAKE BOOSTER

[75] Inventor: Jean-Pierre Gautier, Aulnay Sous Bois, France

[73] Assignee: Bendix France, Drancy, France

[21] Appl. No.: 34,701

[22] Filed: Apr. 7, 1987

[30] Foreign Application Priority Data

Apr. 8, 1986 [FR] France .................. 86 04976

[51] Int. Cl.⁴ .............................................. F15B 9/10
[52] U.S. Cl. .................. 91/369.4; 91/369.3; 91/369.2; 91/369.1; 91/376 R; 60/547.1
[58] Field of Search ............ 91/369 A, 369 B, 369 C, 91/369 R, 376 R, 387; 60/547.1

[56] References Cited

U.S. PATENT DOCUMENTS

| 4,491,058 | 1/1985 | Morin | 91/376 R |
| 4,577,548 | 3/1986 | Gautier | 91/369 A |
| 4,594,937 | 6/1986 | Meynier et al. | 91/376 R |

FOREIGN PATENT DOCUMENTS

| 101658 | 2/1984 | European Pat. Off. . | |
| 153888 | 9/1985 | European Pat. Off. . | |
| 2506402 | 11/1982 | France . | |
| 2064690 | 6/1981 | United Kingdom | 91/369 C |
| 2065809 | 7/1981 | United Kingdom | 91/369 C |
| 2148426 | 5/1985 | United Kingdom | 91/369 C |
| 2148427 | 5/1985 | United Kingdom . | |
| 2162268 | 1/1986 | United Kingdom . | |

Primary Examiner—Robert E. Garrett
Assistant Examiner—Thomas E. Denion
Attorney, Agent, or Firm—Larry J. Palguta; Ken C. Decker

[57] ABSTRACT

The booster comprises a positioning member (24) for placing the distribution valve mechanism (12, 13, 14) in a specific rest position in the rest position of the booster, the positioning member (24) being coupled to one end (28) of a retractable elastic member of low elasticity (29), advantageously a spiral spring, which is deformable between a relaxed configuration and, in the rest position of the booster, a retractable configuration, in which the end (28) is located in a fixed reference position relative to the housing (1) of the booster, determining the rest position of the positioning member (24).

7 Claims, 3 Drawing Sheets

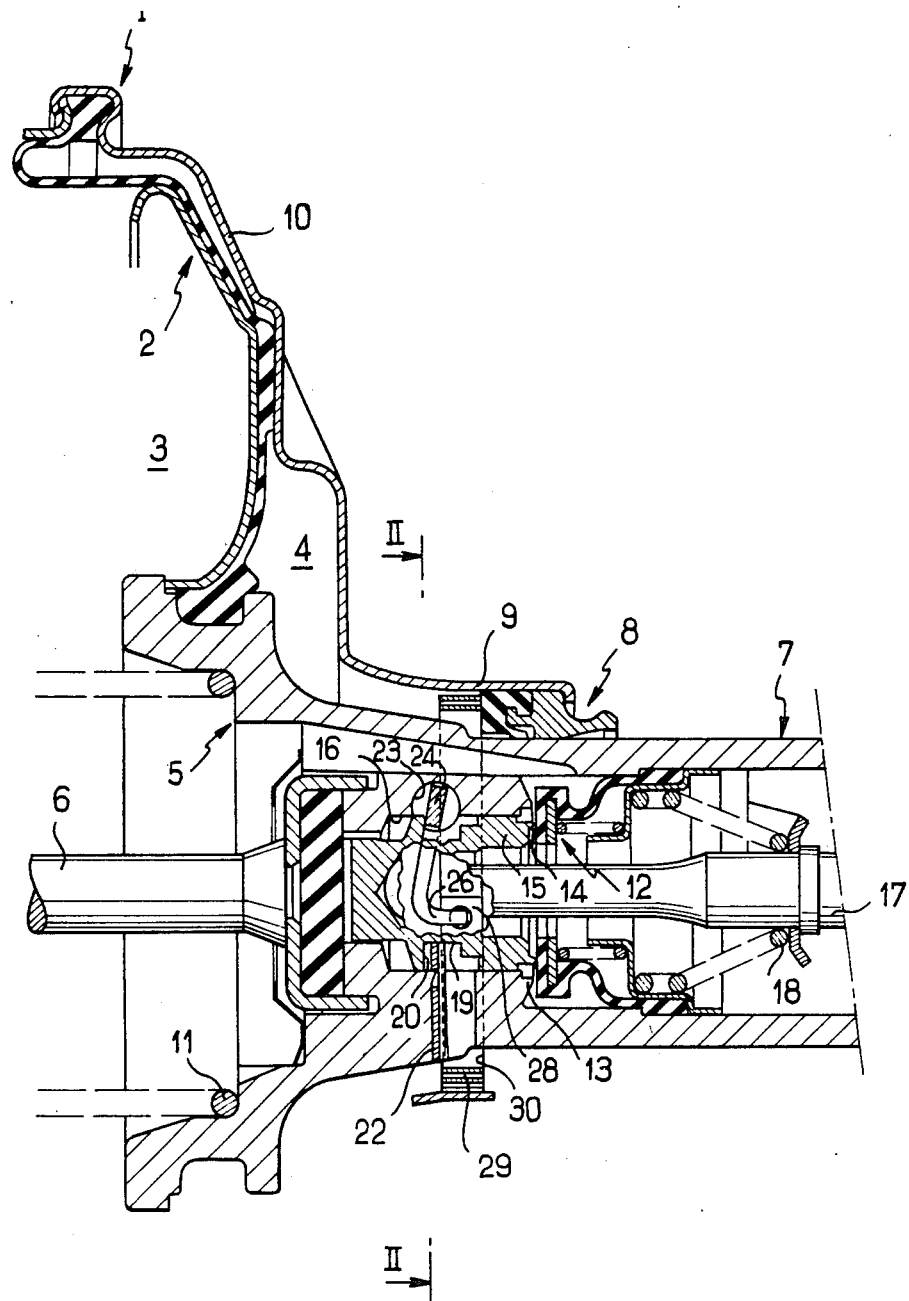
FIG_1

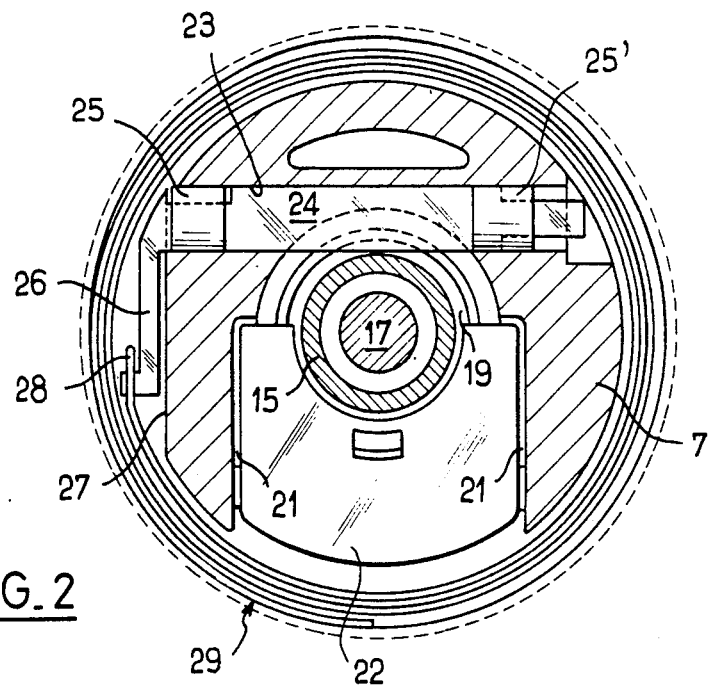
FIG_2
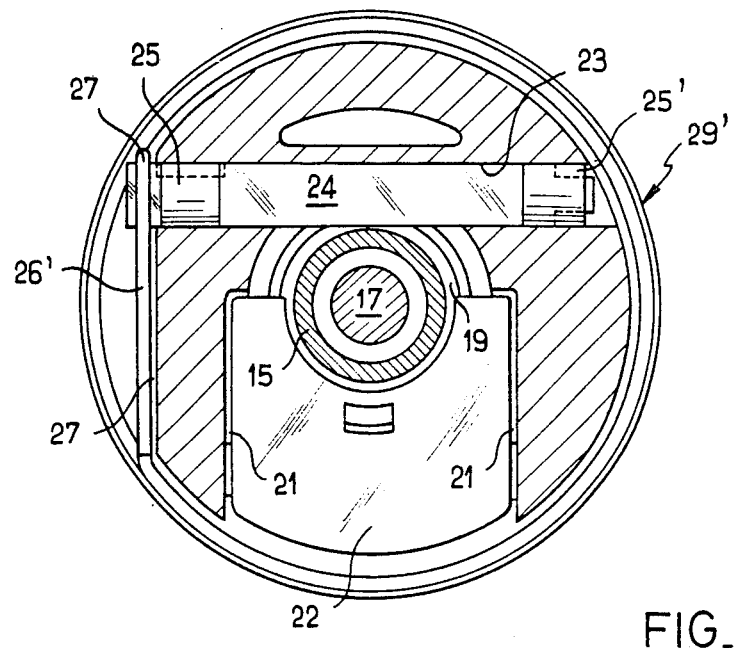
FIG_4

BRAKE BOOSTER

The present invention relates to brake boosters and more particularly to pneumatic boosters of the type comprising a housing, a movable wall dividing the housing into two chambers and axially displaceable in the housing under the control of a distribution valve means arranged in a valve body integral with the movable wall and actuable by means of an input member, and at least one valve means positioning member supported by the valve body and displaceable relative to the latter from a rest position, when the booster is in the inactive rest position, in which the positioning member interacts with the valve means to put the latter in a corresponding rest position relative to the valve body.

Boosters of this type are described in the documents FR-A-No. 2,469,589 and EP-A-No. 0.153,888, in which the member positioning the distribution valve means, consisting respectively of a key mounted in the valve body with a possibility of axial movement or of a rocking member mounted pivotally in the valve body, comes up against a stationary surface connected to the housing at the end of the return stroke of the booster towards its rest position, in an arrangement where the positioning of the valve means takes place abruptly at the end of the return stroke of the booster, with the attendant disadvantages of a likewise abrupt stress which is exerted on the distribution valve means and which can give rise to risks of jarring of the distribution valve means discernible by the user and, in the course of time, a loss of accuracy of the valve means and even damage to the latter which can affect the smooth operation of the booster.

It is therefore an object of the present invention to provide a brake booster of the type in question, which avoids the above-mentioned disadvantages and which ensures accurate and reliable operation and is free of jolts when activated.

To achieve this, according to one feature of the invention, the booster has a retractable elastic member of low elasticity having one end associated with the positioning member and being deformable between a relaxed configuration and, in the rest position of the booster, a retracted configuration, in which its end is located in a fixed reference position relative to the housing, determining the rest position of the positioning member and consequently of the distribution valve means.

According to a more particular feature of the invention, in the rest position of the booster the elastic member bears on a stationary surface connected to the housing and then has a specific contracted thickness.

By means of such an arrangement, when the booster approaches its rest position, the elastic member, despite its low elasticity, prepositions the positioning member relative to the valve means in advance, the final phase of positioning of the valve means in its rest position being carried out progressively and in a damped manner, without any impact between the positioning member and the valve means, the final rest position of the latter being determined with all the required accuracy by the fixed reference position relative to the housing assumed by the end of the elastic member, of which the reaction force under compression increases progressively from its relaxed configuration to its retracted configuration. On the other hand, because of the association between the end of the elastic member and the positioning member, the problems normally encountered in maintaining the positioning member relative to the valve body are eliminated.

The documents GB-A-No. 2,155,132 and GB-A-No. 2,095,778 describe boosters of the type in question, in which the positioning member has a small elastomeric buffer which only makes it possible to reduce the contact noises between the positioning member and a fixed surface against which it bears, without ensuring the progressive actuation of the arrangement according to the invention and, since the elastomeric material of the buffer can be damaged or undergo plastic flow, making it impossible to guarantee a fixed reference position at rest for the positioning member throughout the entire service life of the booster.

According to a more particular feature of the invention, in an especially simple, reliable and robust arrangement entailing only low production costs, the elastic member consists of a spiral spring with an axis parallel to the axis of movement of the movable wall and is advantageously arranged round the valve body.

The invention will now be described by way of example with reference to the accompanying drawings in which:

FIG. 1 is a partial view in longitudinal section of a first embodiment of a brake booster according to the invention;

FIG. 2 is a diagrammatic cross-sectional view in the sectional plane II—II of FIG. 1;

FIG. 4 is a cross-sectional view, similar to that of FIG. 2, of the embodiment of FIG. 3.

In the following description and in the drawings, identical or similar elements bear the same reference numerals, if appropriate with indices.

Figure 3:
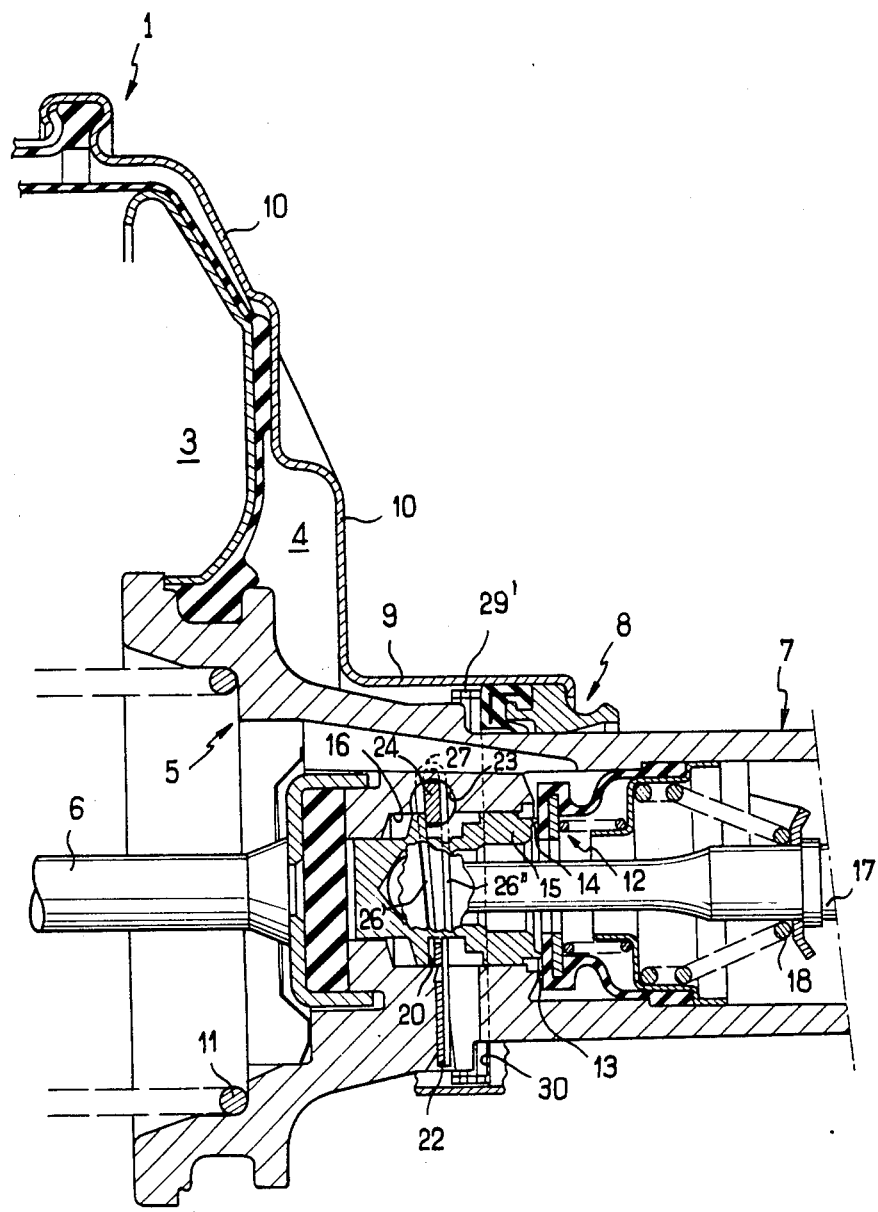
FIG. 3 is a view similar to that of FIG. 1, showing a second embodiment of the invention.

As illustrated in the drawings, a pneumatic brake booster according to the invention comprises a housing 1 divided internally by a movable piston wall 2 into a front chamber 3, or vacuum chamber, and a rear chamber 4, or working chamber. The movable wall 2 is fastened centrally to a hub 5 carrying the output member 6 of the booster and is extended rearwards and outwards by means of a tubular valve body 7 guided sealingly and slideably by a guide and sealing assembly 8 mounted in a rear tubular extension 9 of the rear wall 10 of the housing 1, against which the movable wall 2 is brought to bear by a restoring spring 11 in the rest position of the booster.

Arranged in the valve body 8 is a distribution valve means which, in the example illustrated, comprises an elastically stressed flap means designated as a whole by the reference 12, axially displaceable to interact selectively with a fixed flap seat 13 formed centrally in the valve body 7 and with a movable flap seat 14 formed by the rear end of a plunger 15 sliding in a central bore 16 of the valve body 7 and fixed to the end of an input and actuating rod 17, the other end of which is intended to be connected to a vehicle brake pedal (not shown). The rod 17 (and consequently the plunger 15) is stressed towards the rear of the valve body 7 by a restoring spring 18 bearing on a shoulder of the rod 17 and on a shoulder inside the valve body 7. The plunger 15 has a peripheral annular groove 19 defining an annular shoulder 20 directed rearwards.

Force-fitted in a radial groove 21 (FIG. 2) in the valve body 7 opening into the bore 16 is a key 22 of general plane shape, produced from a metal plane and, for example, of the type described in the document EP-A-No. 0,101,658 in the applicant's name, the content of which is assumed to be incorporated herein for reference. The key 22 has a U-shaped inner end which, once the key 22 is positioned in the groove 21, extends into the peripheral groove 19 of the plunger 15 without radial contact with this peripheral groove 19, in order, because the shoulder 20 comes up against the U-shaped inner end of the key 22, to limit the retraction of the plunger 15 relative to the valve body 7 under the effect of the restoring spring 18 and thus determine a maximum play, called excess opening during return, between the fixed flap seat 13 and the flap element 12. In the embodiment illustrated, the valve body 7 has, on the side of the plunger 15 opposite the radial groove 21, a transverse through-bore 23, in which is mounted rotatably a pivoting positioning member 24 which is produced from a metal plate and the central part of which extends into the bore 16 and into the peripheral groove 19 of the plunger 15, to interact selectively with a zone of the shoulder 20 of the plunger 15 diametrically opposite in relation to the U-shaped inner end of the key 22. The pivoting positioning member 24 is supported and guided in rotation in the bore 23 by a pair of plastic cylindrical bearings 25, 25' fitted laterally onto the respective ends of the strip forming the pivoting positioning member 24.

In the embodiment shown in FIGS. 1 and 2, the pivoting positioning member 24 is actuated by an outer arm 26 advantageously produced in one piece with the strip 24 and pivoting in the vicinity of a cut-off face 27 formed in the periphery of the valve body 7. The free end of the arm 26 has a lug extending outwards and received in an orifice made in the end 28 of an end turn of reduced diameter of a conical spiral spring 29 of low elasticity, having turns of rectangular cross-section which, in the example illustrated, are arranged round the valve body 16, and having a maximum outside diameter less than the inside diameter of the tubular extension 9 of the rear wall 10 of the housing 1, these turns being intended to interact by means of their rear ends with a stationary reference surface 30 by coming up against it, the latter being advantageously formed by the front annular face of the gasket of the guide and sealing assembly 8.

The mode of operation of the booster just described is as follows:

When the booster is actuated by exerting a forward axial force on the input rod 17, the plunger 15 moves forwards and, in a first instance, after a brief initial actuating stroke, causes the flap element 12 to come into contact with the fixed flap seat 13 to isolate the two chambers 4 and 3 from one another, and then, in a second instance, causes the opening of a passage between the flap element 12 and the movable flap seat 14 to admit the atmospheric pressure into the working chamber 4 and thus provide power assistance on the output rod 6. During such a braking phase, the plunger 15 does not interfere with any of the positioning members 22 and 24. If the force exerted on the input rod 17 is relaxed during such a braking phase, the latter moves rearwards under the effect of the restoring spring 18, and the plunger 15, returning into contact by means of its movable seat 14 with the flap element 12, moves the latter elastically rearwards to free it from the fixed flap seat 13 and to restore communication between the two chambers 4 and 3. To allow a rapid recovery of balance in pressure (in this particular case, partial vacuum) between the two chambers, the plunger 15 is allowed to move back over a relatively long distance in relation to the valve body 7, the maximum passage between the fixed flap seat 13 and the flap element 12 being determined accurately because the shoulder 20 comes up against the key 22 under the effect of the restoring spring 18. During this operating phase, the pivoting positioning member 24 does not interfere with the movement of the plunger 15 relative to the valve body 7. In contrast to this, when the force exerted on the input rod is finally released, the movable wall 2 is returned towards the rear wall 10 of the housing 1 under the effect of its restoring spring 11. This retracting movement of the movable wall 2 and of the valve body 7 causes progressive compression of the spring 29 previously bearing against the stationary surface 30 by means of the rear end of its last rear turn. This progressive compression of the spring 29 first brings the pivoting positioning member 24 cleanly up against the shoulder 20 of the plunger 15 and then, in proportion with the compression of the spring 29, starts a pivoting of the arm 26 to the right (in FIG. 1), tending to move the plunger 15 forwards and at the same time moving its shoulder 20 away from the key 22. When the booster reaches the end of its return stroke, the reaction caused by the plunger 15 on the arm 26 via the positioning member 24 brings the spring 29 into the completely retracted configuration, in which all the turns bear by means of their rear end against the stationary reference surface 30, thus giving the pivoting positioning member 24 a perfectly defined angular orientation relative to the valve 47 and thus positioning the plunger 15 in a specific relative position in relative to the valve body 7 which in the mean time has reached its assigned rest position, thereby determining the play required between the fixed flap seat 13 and the flap element 12. When the booster is actuated once again for a braking phase, the operations described above are reproduced identically, the forward movement of the valve body 7 and of the movable wall 2 being accompanied by a progressive relaxation of the spring 29, until the latter resumes a completely relaxed configuration preparatory to a new phase of retraction towards the rest position of the booster.

The embodiment illustrated in FIGS. 3 and 4 is, in broad terms, similar to that just described and differs from it essentially in the nature of the elastic member 29' and its coupling to the pivoting positioning member 24. The latter is identical to that described in the preceding embodiment, but here is not produced in one piece with the actuating arm 26. In the embodiment of FIGS. 3 and 4, the actuating arm of the pivoting positioning member 24 is formed by two contiguous bent arms 26' and 26" forming a loop 27 surrounding one end of the plate forming the pivoting positioning member 24 extending the inner end turn of a helical spring with contiguous turns of square cross-section 29' which, as in the preceding embodiment, is arranged round the valve body 7 and which bears, this time solely by means of its rear end turn, against the stationary reference surface 30 in the tubular extension 9 of the rear wall 10 of the housing 1.

In this embodiment, the reference position finally assumed by the arms 26' and 26" is determined by the axial thickness of the spring 29' predetermined in the compression phase by contiguous turns. The mode of operation of this second embodiment is identical in all respects to that described above with reference to FIGS. 1 and 2.

Although the present invention has been described with regard to particular embodiments, it is not limited by these, but, on the contrary, is capable of undergoing modifications and having alternative forms which will become apparent to a person skilled in the art. In particular, if required, the elastic member 29' of reduced diameter can be accommodated in an outer longitudinal groove of the valve body 7.

What is claimed is:

1. A brake booster comprising a housing, a movable wall dividing the housing into two chambers and displaceable axially in the housing under the control of distribution valve means arranged in a valve body integral with the movable wall and actuable by means of an input member, and at least one valve means positioning member supported by the valve body and displaceable relative to the valve body from a rest position, when the booster is in a rest position, in which the positioning member interacts with the valve means to put the valve means in a corresponding rest position relative to the valve body, characterized in that the booster has a retractable elastic member of low elasticity having one end associated with the positioning member and deformable between a relaxed configuration and a retracted configuration, in the rest position of the booster, in which the one end is located in a fixed reference position relative to the housing to determine the rest position of the positioning member, and in the rest position of the booster the elastic member bearing on a stationary surface connected to the housing and the elastic member having a specific contracted thickness, the elastic member comprising a spiral spring with an axis parallel to an axis of movement of the movable wall.

2. The booster according to claim 1, characterized in that the elastic member is a conical spiral spring.

3. The booster according to claim 1, characterized in that the elastic member is a spiral spring with concentric turns.

4. A brake booster comprising a housing, a movable wall dividing the housing into two chambers and displaceable axially in the housing under the control of distribution valve means arranged in a valve body integral with the movable wall and actuable by means of an input member, and at least one valve means positioning member supported by the valve body and displaceable relative to the valve body from a rest position, when the booster is in a rest position, in which the positioning member interacts with the valve means to put the valve means in a corresponding rest position relative to the valve body, characterized in that the booster has a retractable elastic member of low elasticity having one end associated with the positioning member and deformable between a relaxed configuration and a retracted configuration, in the rest position of the booster, in which the one end is located in a fixed reference position relative to the housing to determine the rest position of the positioning member, and in the rest position of the booster the elastic member bearing on a stationary surface connected to the housing and the elastic member having a specific contracted thickness, the elastic member comprising a spiral spring arranged concentrically around the valve body.

5. A brake booster comprising a housing, a movable wall dividing the housing into two chambers and displaceable axially in the housing under the control of distribution valve means arranged in a valve body integral with the movable wall and actuable by means of an input member, and at least one valve means positioning member supported by the valve body and displaceable relative to the valve body from a rest position, when the booster is in a rest position, in which the positioning member interacts with the valve means to put the valve means in a corresponding rest position relative to the valve body, characterized in that the booster has a retractable elastic member of low elasticity having one end associated with the positioning member and deformable between a relaxed configuration and a retracted configuration, in the rest position of the booster, in which the one end is located in a fixed reference position relative to the housing to determine the rest position of the positioning member, and in the rest position of the booster the elastic member bearing on a stationary surface connected to the housing and the elastic member having a specific contracted thickness, the stationary surface formed by an element attached in a central part of the housing surrounding the valve body, the positioning member mounted rotatably in a transverse bore of the valve body and having an actuating arm located outside the valve body and coupled to the elastic member, the actuating arm formed by the one end of the elastic member.

6. The booster according to claim 5, characterized in that the actuating arm formed by the one end of the elastic member is bent in the form of a U around one end of the actuating member.

7. A brake booster comprising a housing, a movable wall dividing the housing into two chambers and displaceable axially in the housing under the control of distribution valve means arranged in a valve body integral with the movable wall and actuable by means of an input member, and at least one valve means positioning member supported by the valve body and displaceable relative to the valve body from a rest position, when the booster is in a rest position, in which the positioning member interacts with the valve means to put the valve means in a corresponding rest position relative to the valve body, characterized in that the booster has a retractable elastic member of low elasticity having one end associated with the positioning member and deformable between a relaxed configuration and a retracted configuration, in the rest position of the booster, in which the one end is located in a fixed reference position relative to the housing to determine the rest position of the positioning member, and in the rest position of the booster the elastic member bearing on a stationary surface connected to the housing and the elastic member having a specific contracted thickness, the valve means comprising a flap element interacting selectively with a first flap seat formed in the valve body and a second flap seat formed concentrically at an end of the input member, the positioning member, in the rest position, positioning an assembly comprising the flap element and second flap seat in relation to the first flap seat, a plunger forming the second flap seat connected to the input member and sliding in a central bore of the valve body, the positioning member having a part extending in the bore and interacting with a peripheral shoulder of the plunger, and the booster having a second positioning member fastened in a radial groove of the valve body and interacting with the shoulder of the plunger.

* * * * *